No. 610,242. Patented Sept. 6, 1898.
J. N. POAGE.
INLET VALVE FOR WATER TANKS.
(Application filed Jan. 27, 1898.)

(No Model.)

Attest.
L. E. Layman.
Ida Heitz.

Inventor.
John N. Poage.
By James N. Layman.
Atty.

THE NORRIS PETERS CO., PHOTO-LITHO., WASHINGTON, D. C.

UNITED STATES PATENT OFFICE.

JOHN N. POAGE, OF COLLEGE HILL, OHIO.

INLET-VALVE FOR WATER-TANKS.

SPECIFICATION forming part of Letters Patent No. 610,242, dated September 6, 1898.

Application filed January 27, 1898. Serial No. 668,114. (No model.)

*To all whom it may concern:*

Be it known that I, JOHN N. POAGE, a citizen of the United States, residing at College Hill, in the county of Hamilton and State of Ohio, have invented certain new and useful Improvements in Inlet-Valves for Water-Tanks; and I do hereby declare the following to be a full, clear, and exact description of the invention, reference being had to the annexed drawings, which form a part of this specification.

This invention relates to those valves used for admitting water to tanks employed at railroad-stations for supplying locomotive-tenders and other similar purposes where such tanks or cisterns must be filled very quickly; and my improvement comprises a reciprocating rotary valve that has a free and unobstructed delivery at each end and is so evenly balanced within its inclosing shell or casing as to be readily operated by an ordinary float, as hereinafter more fully described.

Figure 1:
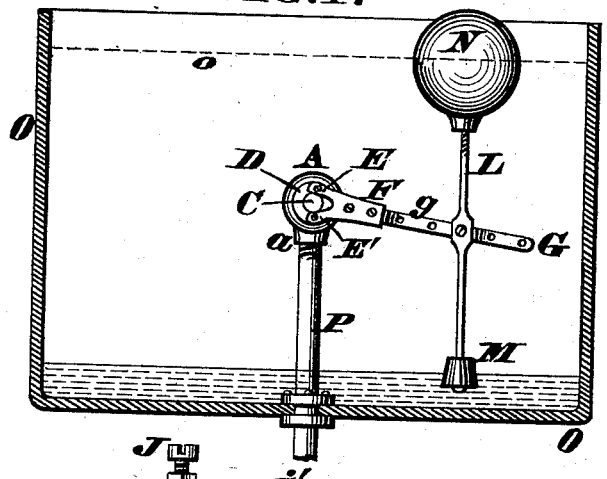
Figure 2:
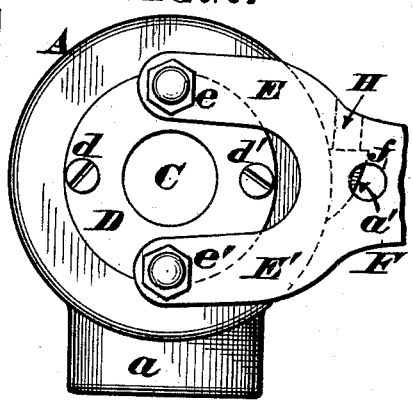
Figures 3, 4:
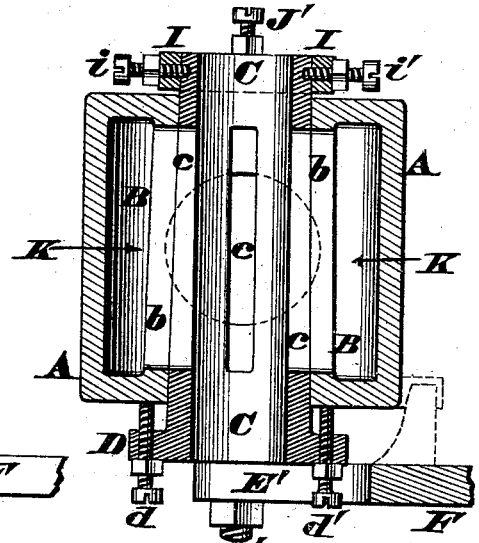
Figure 5:
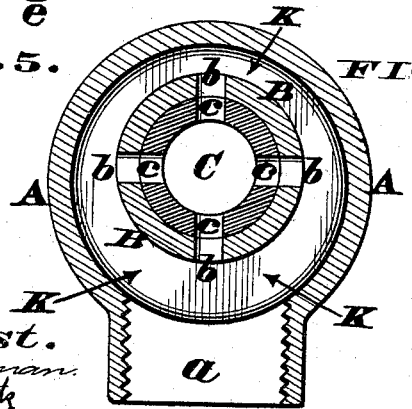
Figure 6:
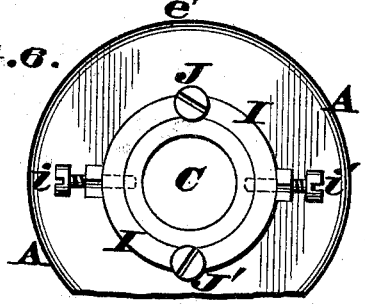

In the annexed drawings, Figure 1 is a vertical section of a tank provided with my improved inlet-valve, the tank being almost empty and the valve opened. Fig. 2 is an enlarged elevation of a larger end of the valve. Fig. 3 is a plan of the valve. Fig. 4 is a horizontal section of the same. Fig. 5 is a transverse section of the valve. Fig. 6 is an elevation of a smaller end of the valve.

The outer shell or casing A is preferably cylindrical, is closed at its ends, is adapted to be arranged horizontally within a tank or cistern, and has projecting from its lower side an integral screw-threaded neck a, to which the inlet-pipe is attached; but for an unusually heavy head of water this connection of pipe and shell may be effected with flanges and bolts. Extending from end to end of the shell and integral therewith is a tubular seat B, having a series of longitudinal slots b, of which four are shown, although six or eight may be used, the object of this seat being to admit a tubular plug or valve proper, C, having slots c corresponding to those of said seat. The exterior of this plug-valve is somewhat tapering, as seen in Fig. 4, so as to be readily adjusted within its seat B b, and the larger end of said valve has an integral annular flange D, within which two set-screws d d' are tapped, the ends of said screws being in contact with one of the closed heads of the shell.

e e' are bolts wherewith the forks E E' of a lever F are rigidly united to the valve, the lever being perforated at f. The perforations admit bolts wherewith an extension G is fastened to said lever, the extension being also perforated at g, as seen in Fig. 1. Furthermore, the lever F has a lateral lug H, adapted at the proper moment to contact with a stop a' of the shell or casing A.

Applied to the smaller end of the valve is a collar I, having set-screws i i', whose points enter pits in the side of said valve, so as to compel it and said collar to turn together. Tapped in this collar are other set-screws J J', whose points bear against another head of the shell.

K is a continuous or unbroken water-chamber extending completely around the slotted valve-seat B b.

L is a rod coupled to the lever extension G g and having at its lower end a weight M and at its upper end a suitable float N.

O is a tank or water-cistern, and P is an inlet-pipe entering the bottom thereof and engaged with the neck a of the valve-shell. My valve is arranged to operate in the following manner:

In preparing the patterns the stop a' must be so located on the shell A and the lug H so arranged on the lever F as to cause these devices a' H to contact only when the valve is wide open. This contact may take place when lever F is substantially horizontal, as seen in Fig. 2, but preferably when said lever is inclined about at the angle seen in Fig. 1. Again, the patterns may be so arranged as to cause the axis of valve C to be in line with the center of the shell A, as seen in Figs. 1, 2, and 6; but I prefer locating the axis of said valve above that of said shell, as represented in Fig. 5. These precautions having been adopted and the fork E E' of lever F bolted to the annular flange D of valve C, the latter is inserted within the tubular seat B b, and then the collar I is secured to the smaller end of said valve by means of the screws i i'. The next act consists in so adjusting the other screws J J' as to leave a slight interval between the opposing faces of the shell and collar, as seen in Figs. 3 and 4, the object of this interval being to permit a limited leakage around the valve C even when it is completely closed. This constant but limited leakage prevents sediment accumulating around the plug and rendering it difficult to be turned within its bearing or seat B b. The screws d d' are then adjusted until their ends bear snugly against the head of shell A, thereby rendering it impossible for the valve C c to shift longitudinally in either direction. The valve-shell A is then mounted upon the inlet-pipe P while the tank O is empty, the weight M being sufficient to overcome the friction of plug C and turn it around to a wide-open position, at which moment the lug H is arrested by the stop a', as previously described. Water being now let into this pipe and passing up into the chamber K flows through the coincident slots b c and escapes freely through the two open ends of the plug C, thereby rendering it impossible to injure the valve in case a heavy head of water should be turned on very suddenly.

By referring to Fig. 5 it will be noticed that the capacity of chamber K is greatest at its bottom where the water first flows in, but is gradually reduced upwardly as it reaches the level of the side slots of the plug C and is the least at the top, where there is but one inlet to said plug. The water continues to flow into the tank until it is filled about to the level of the dotted line o, and then the float N ascends, pulls up the free end of lever G, and thus turns the plug C and automatically shuts off the supply to the tank, with the exception of the slight leakage permitted around said plug, as previously explained. This prompt and ready closure of the valve is accomplished in part because it is perfectly balanced and can be turned with the least possible exertion of force and in part because it is so loosely fitted within its seat B b as to permit a constant but limited waste. Finally, the perforations g enable the rod L to be adjusted at the most suitable distance along the lever extension G, and the weight M causes said rod to remain in a vertical position, and thus prevents the float N swaying from side to side within the tank when water is admitted.

I claim as my invention—

1. The combination, in a balanced valve, of the shell A, having an inlet and closed heads, which heads are united by a tubular seat B, slotted longitudinally at b; a hollow plug C fitted in said seat, slotted longitudinally at c, and projecting beyond said closed heads; a chamber K surrounding said seat; and means at one end of said plug for operating it by a float, the arrangement of these devices being such as to cause the plug to receive water at its slot c, and discharge it from the end of said plug, as herein set forth.

2. The combination, in a balanced valve, of the shell A having an inlet and closed heads, which heads are united by a tubular seat B, slotted longitudinally at b, and having its axis eccentric with reference to that of said shell; a hollow plug C, fitted in said seat, slotted longitudinally at c, and projecting beyond said closed heads; a chamber K surrounding said eccentric seat; and means at one end of said plug for operating it by a float, the arrangement of these devices being such as to cause the plug to receive water at its slot c, and discharge it from the end of said plug, as set forth.

3. The combination, in a balanced valve, of the shell A, having a side inlet a, and closed heads; a tubular seat B uniting said heads, and slotted longitudinally at b; a hollow conical plug C fitted in said seat, slotted longitudinally at c, and projecting beyond said closed heads; a chamber K surrounding said seat; and a float-lever attached to the larger end of said plug, the arrangement of these devices being such as to cause the plug to receive water at its slot c, and discharge it from each end of said plug, as set forth.

4. In an inlet-valve of the character described, the plug C c, having a collar I, provided with two sets of screws i, i', J, J', and an integral flange D, provided with a pair of set-screws d, d', for the purpose stated.

In testimony whereof I affix my signature in presence of two witnesses.

JOHN N. POAGE.

Witnesses:
JAMES H. LAYMAN,
JOHN C. ROGERS.